US012654733B2

(12) United States Patent
Tsukerman et al.

(10) Patent No.: US 12,654,733 B2
(45) Date of Patent: Jun. 16, 2026

(54) SYSTEM AND METHOD EXTENDING DRIVER ENGAGEMENT TO REMOTE DEVICE FOR AUTONOMOUS HAND-OFF AND EYES-OFF FEATURES

(71) Applicant: GM GLOBAL TECHNOLOGY OPERATIONS LLC, Detroit, MI (US)

(72) Inventors: Boris Tsukerman, Ein Yahav (IL); Amir Tsvitov, Ness Ziona (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/740,255

(22) Filed: Jun. 11, 2024

(65) Prior Publication Data

US 2025/0376186 A1    Dec. 11, 2025

(51) Int. Cl.
*B60W 50/16*          (2020.01)
*B60K 35/28*          (2024.01)
                    (Continued)

(52) U.S. Cl.
CPC ............ *B60W 50/16* (2013.01); *B60K 35/28* (2024.01); *B60W 40/08* (2013.01); *B60W 60/005* (2020.02); *G06V 20/597* (2022.01); *G06V 40/172* (2022.01); *B60K 2360/566* (2024.01); *B60K 2360/569* (2024.01);
                    (Continued)

(58) Field of Classification Search
CPC .... B60W 50/16; B60W 60/005; B60W 40/08; B60W 2540/043; B60W 2540/225; B60W 2540/229; B60W 2040/0818; B60W 2050/143; B60W 2050/146; B60W 2420/403; G06V 40/172; G06V 20/597;
                    (Continued)

(56) References Cited

U.S. PATENT DOCUMENTS 10,289,113 B2 *  5/2019  Perkins ............. B60W 60/0059
10,618,523 B1 *  4/2020  Fields .................... G06Q 40/08
                    (Continued)

FOREIGN PATENT DOCUMENTS

DE      102020100273 A1    7/2021
DE      102022129845 A1    5/2024

OTHER PUBLICATIONS

Autocrypt (2023). The State of Level 3 Autonomous Driving in 2023: Ready for the Mass Market? Retrieved from: https://autocrypt. io/the-state-of-level-3-autonomous-driving-in-2023/.

*Primary Examiner* — Zhen Y Wu

(74) *Attorney, Agent, or Firm* — Ingrassia Fisher & Lorenz, LLP | IF&L

(57)          ABSTRACT

A system to enhance performance and usability of a state machine implementation by an electronic control unit within a vehicle having autonomous operating capabilities is provided. The state machine provides an escalation state used to exit from status quo. The vehicle driver has a mobile device within the vehicle. The system includes an enhanced state machine configured to use the mobile device. The mobile device non-intrusively captures multimodal driver engageability data and generates an enhanced engageability score. The enhanced engageability score augmenting a decision by the state machine on whether the escalation stat transition shall occur. The enhanced state machine additionally provides a signal to alert the driver through the mobile device that the escalation state is imminent.

20 Claims, 8 Drawing Sheets

(51) Int. Cl.

| | |
|---|---|
| *B60W 40/08* | (2012.01) |
| *B60W 60/00* | (2020.01) |
| *G06V 20/59* | (2022.01) |
| *G06V 40/16* | (2022.01) |
| *B60W 50/14* | (2020.01) |

(52) U.S. Cl.

CPC .............. *B60W 2040/0818* (2013.01); *B60W 2050/143* (2013.01); *B60W 2050/146* (2013.01); *B60W 2420/403* (2013.01); *B60W 2540/043* (2020.02); *B60W 2540/225* (2020.02); *B60W 2540/229* (2020.02)

(58) Field of Classification Search

CPC .............. B60K 35/28; B60K 2360/569; B60K 2360/566

USPC ........................................................ 340/576

See application file for complete search history.

(56) References Cited

U.S. PATENT DOCUMENTS

| | | | | |
|---|---|---|---|---|
| 10,935,974 | B1 * | 3/2021 | Fields | B60W 30/17 |
| 11,420,637 | B2 * | 8/2022 | Fairgrieve | B60W 30/16 |
| 12,077,192 | B2 * | 9/2024 | Oba | B60K 28/066 |
| 2012/0215403 | A1 | 8/2012 | Tengler et al. | |
| 2017/0028987 | A1 * | 2/2017 | Yamada | B60N 2/0022 |
| 2017/0038773 | A1 * | 2/2017 | Gordon | G08G 1/012 |
| 2017/0248951 | A1 * | 8/2017 | Perkins | G05D 1/0248 |
| 2017/0248952 | A1 * | 8/2017 | Perkins | G05D 1/0061 |
| 2017/0277182 | A1 * | 9/2017 | May | G05D 1/0061 |
| 2017/0349186 | A1 * | 12/2017 | Miller | B60W 50/14 |
| 2018/0118219 | A1 * | 5/2018 | Hiei | B60W 50/14 |
| 2019/0389455 | A1 * | 12/2019 | Reed | B60W 30/085 |
| 2020/0028736 | A1 * | 1/2020 | Park | H04W 72/23 |
| 2020/0180436 | A1 * | 6/2020 | Obiagwu | G09G 3/3406 |
| 2020/0207358 | A1 * | 7/2020 | Katz | G06V 20/56 |
| 2020/0264608 | A1 * | 8/2020 | Rosati | G05D 1/0061 |
| 2020/0302702 | A1 * | 9/2020 | Rodriguez Bravo | G05D 1/0061 |
| 2021/0061299 | A1 * | 3/2021 | Wang | B60K 35/29 |
| 2022/0207888 | A1 * | 6/2022 | Nakamura | B60K 35/235 |
| 2024/0367645 | A1 * | 11/2024 | Sasmal | B60W 50/16 |
| 2024/0367669 | A1 * | 11/2024 | Fujita | B60R 25/04 |
| 2024/0425086 | A1 * | 12/2024 | Kim | B60W 60/005 |

* cited by examiner

SYSTEM AND METHOD EXTENDING DRIVER ENGAGEMENT TO REMOTE DEVICE FOR AUTONOMOUS HAND-OFF AND EYES-OFF FEATURES

INTRODUCTION

The statements in this section merely provide background information related to the present disclosure and may not constitute prior art.

This application relates to autonomous vehicles and more particularly to state machines for autonomous control for vehicles or other applications.

Autonomous vehicle technology spans a range of automatic control levels, ranging from singular driver assistance features to full control over major aspects of the driving of the vehicle without human assistance. For convenience, this range of automation may be described generally in terms of six enumerated levels, ranging from Level Zero (no automation) to Level 5 (full automation).

FIG. 1 illustrates these six levels generally at 116. The levels comprise Level Zero as at 118), Level 1 (as at 120), Level 2 (as at 122), Level 3 (as at 124), Level 4 (as at 126), and Level 5 (as at 128). For brevity, in some instances these levels will be identified as L0, L1, L2 . . . L5.

There is an important line of demarcation between Level 2 and Level 3. In Level 2 the driver is responsible for monitoring the driving environment and is thus still responsible for performing at least some driving functions, whereas in levels three and beyond the autonomous driving system monitors the driving environment and is thus essentially driving the vehicle. Thus, during Level Zero through Level 2 (shown collectively at 130), the driver is responsible for monitoring the driving environment, whereas during Level 3 through Level 5 (shown collectively at 132), the vehicle is using autonomous operations and monitors the driving environment. Here are the six levels in greater detail:

Level Zero 118 state refers to a vehicle operation with no automation operation, such that the driver has manual control over the vehicle 104 and performs all of the driving tasks (e.g., steering, acceleration, braking, and the like).

Level One 120 refers to a vehicle operation having one or more driver assistance features and/or functions such that the vehicle 104 performs a single automated system (e.g., cruise control and monitoring speed through cruise control). However, the driver is still in control over all vehicle features and functions and may take control over any driver assistance functions. In another form, Level Two 122 includes a vehicle operation with the vehicle 104 performing partial automation features, such as steering and acceleration, but the driver still monitors all tasks and can take control at any time.

Level Three 124 includes conditional automation, such that the vehicle 104 is equipment with environmental detection capabilities and can perform most driving tasks, but the driver may override at any time.

Level Four 126 is defined as a vehicle operation having a high automation feature with geofencing allows the vehicle to perform all driving tasks under one or more specific circumstances and the driver is still allowed to override any of the driving tasks.

Level Five 128 refers to a vehicle operation having a full automation feature that allows the vehicle to perform all driving tasks under all conditions and requires little to no driver interaction or attention.

SUMMARY

This section provides a general summary of the disclosure and is not a comprehensive disclosure of its full scope or all of its features.

Disclosed is a system and method for monitoring a driver that improves driver monitoring and notification strategy for automotive operations. This is achieved by running a vehicle app on a remote device. The app is connected to the vehicle through a gateway such as CarPlay and/or Android. The app runs a driver monitoring process using a selfie camera on the background and enables driver notifications delivered directly to the remote device.

In another aspect, the system provides a method to monitor and record driver's behavior outside of L2 DMS domain. In another form, the driver monitoring system alerts the driver if he is not looking at the road for longer than a pre-determined time and requires him to look back at the road within a certain pre-determined time. If the driver fails to take control of the steering wheel within the pre-determined time, then an escalation response is initiated. The escalation response may be as simple as initiating a "look again" to re-evaluate the driver's state or determining that the driver is in a non-responsive state. Alternately, the escalation response may step through an escalation flow such as: (i) driver fails to regain look on road; (ii) promote driver takeover by initiating autonomous vehicle maneuver (e.g., steering, braking, acceleration or a combination thereof); (iii) determine non-responsive state of driver and initiate autonomous vehicle coast to standstill.

According to a further aspect of the disclosure, a system is provided to enhance performance and usability of a state machine implementation by an electronic control unit within a vehicle having autonomous operating capabilities, the state machine providing an escalation state used to exit from status quo, wherein the vehicle driver has a remote mobile device within the vehicle.

In one form, the present disclosure provides a system to enhance performance and usability of a state machine implementation by an electronic control unit within a vehicle having autonomous operating capabilities. The state machine provides an escalation state used to exit from status quo. In one aspect, the vehicle driver has a remote mobile device within the vehicle. The system includes an enhanced state machine configured to use the remote mobile device to non-intrusively capture multimodal driver engageability data and generate an enhanced engageability score. The enhanced engageability score augments a decision by the state machine on whether the escalation state transition shall occur. The enhanced state machine additionally provides a signal to alert the driver through the mobile device that the escalation state is imminent.

In some forms, the escalation state is configured to transition the vehicle from a high level of autonomous operation to a lower level of autonomous operation.

In at least one aspect, the escalation state includes notifying the driver, using the remote mobile device, via at least one of the following: chimes, steer wheel lighting or shaking, dashboard, central vehicle screen displays or a combination thereof.

In some forms, the multimodule drive engageability data includes tracking data captured of the driver using a background running application on the mobile device without interaction of the driver.

In one form, the tracking data captured of the driver includes image data of the driver while engaging with an interactive application that simultaneously runs on the mobile device along with the background running application.

In one aspect, the tracking data captured of the driver includes input data from the driver while engaging with an interactive application that simultaneously runs on the mobile device along with the background running application.

In some aspects, the tracking data captured of the driver includes facial imaging data of the driver, wherein the mobile device is configured to determine whether the driver is a registered driver for the vehicle.

In at least one form, the tracking data captured of the driver includes eye tracking data gathered via the background running application, wherein the background running application continuously monitors an eye gaze of the driver.

In some forms, the background running application is configured to determine whether the driver is alert based on the eye tracking data.

In some aspects, the enhanced state machine additionally provide a second signal to lock the mobile device.

In at least one aspect, the enhanced state machine transition the vehicle from one level of autonomous operation to a different level of autonomous operation in order to stop the vehicle.

In one form, the present disclosure provides a method to enhance performance and usability of a state machine implementation by an electronic control unit within a vehicle having autonomous operating capabilities. The state machine provides an escalation state used to exit from status quo, wherein the vehicle driver has a remote mobile device within the vehicle. In one form, the method includes using the remote mobile device to non-intrusively capture multimodal driver engageability data and generate an enhanced engageability score, augmenting a decision by the state machine on whether the escalation state transition shall occur, and providing a signal to alert the driver through the mobile device that the escalation state is imminent.

In some forms, the escalation state includes transitioning the vehicle from a first level of autonomous operation to a second level of autonomous operation.

In some aspects, the escalation state includes notifying the driver, using the remote mobile device, via at least one of the following: chimes, steer wheel lighting or shaking, dashboard, central vehicle screen displays or a combination thereof.

In at least one form, the multimodal driver engageability data includes tracking data captured of the driver using a background running application on the mobile device without interaction of the driver.

In yet another form, the tracking data captured of the driver includes image data of the driver while engaging with an interactive application that simultaneously runs on the mobile device along with the background running application.

In still another form, the tracking data captured of the driver includes input data from the driver while engaging with an interactive application that simultaneously runs on the mobile device along with the background running application.

In some aspects, the tracking data captured of the driver includes facial imaging data of the driver, wherein the mobile device is configured to determine whether the driver is a registered driver for the vehicle.

In yet another aspect, the tracking data captured of the driver includes eye tracking data gathered via the background running application, wherein the background running application continuously monitors an eye gaze of the driver, wherein the background running application is configured to determine whether the driver is alert based on the eye tracking data.

In yet another form, the present disclosure provides a system to enhance performance and usability of a state machine implementation by an electronic control unit within a vehicle having autonomous operating capabilities. The state machine provides an escalation state used to exit from status quo. The vehicle driver has a remote mobile device within the vehicle. The system includes an enhanced state machine configured to use the remote mobile device to non-intrusively capture multimodal driver engageability data and generate an enhanced engageability score. The multimodule drive engageability data includes tracking data captured of the driver using a background running application on the mobile device without interaction of the driver. The background running application is configured to monitor the driver while the vehicle operates in an autonomous level of two or higher. The enhanced engageability score augmenting a decision by the state machine on whether the escalation state transition shall occur. The enhanced state machine additionally provides a signal to alert the driver through the mobile device that the escalation state is imminent.

Further areas of applicability will become apparent from the description provided herein. It should be understood that the description and specific examples are intended for purposes of illustration only and are not intended to limit the scope of the present disclosure.

DESCRIPTION OF THE DRAWINGS

In order that the present disclosure may be well understood, there will now be described various forms thereof, given by way of example, reference being made to the accompanying drawings, in which.

DETAILED DESCRIPTION

Overview of Autonomous Vehicle Technology

Autonomous driving systems are typically designed to operate strictly according to preprogrammed rules that are governed by what is called a state machine. The state machine is implemented in software running on a processor and/or in other suitable gate array logic. The state machine cycles from one defined state to other defined states in response to certain defined conditions or triggers—typically measured by vehicle-mounted sensors. In this way the autonomous driving system operates in a deterministic or predictable fashion according to its set of predefined rules. One can get a sense of the state machine concept by considering the simple traffic light, which cycles through its red-green-yellow-red sequence according to its internal state machine logic. Of course, the state machine of an autonomous driving system is far more complicated than the traffic light.

As will be more fully explained below, one of the innovations introduced in this disclosure is an enhanced state machine that assimilates all the control functions of the conventional state machine and augments those functions to allow more sophisticated sensors to be used. As will be explained, these more sophisticated sensors are provided by a mobile device, such as a smartphone, tablet, smart watch, or other personal data assistance devices (individually and collectively referred to as a mobile device), carried by the driver, and provide sensing modalities not found in vehicle-mounted sensors.

Figure 1:
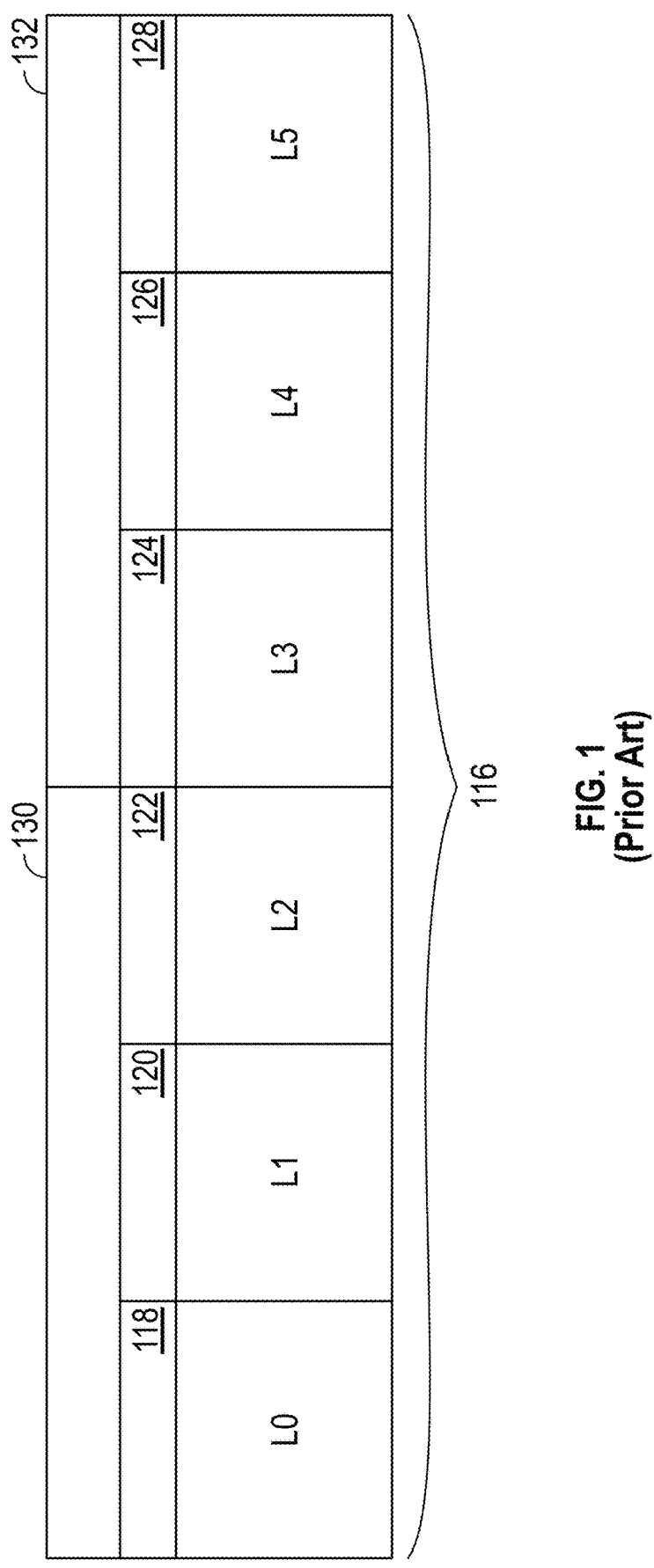
FIG. 1 is a chart illustrating how autonomous vehicle functionality may be subdivided into different levels.
Figure 2:
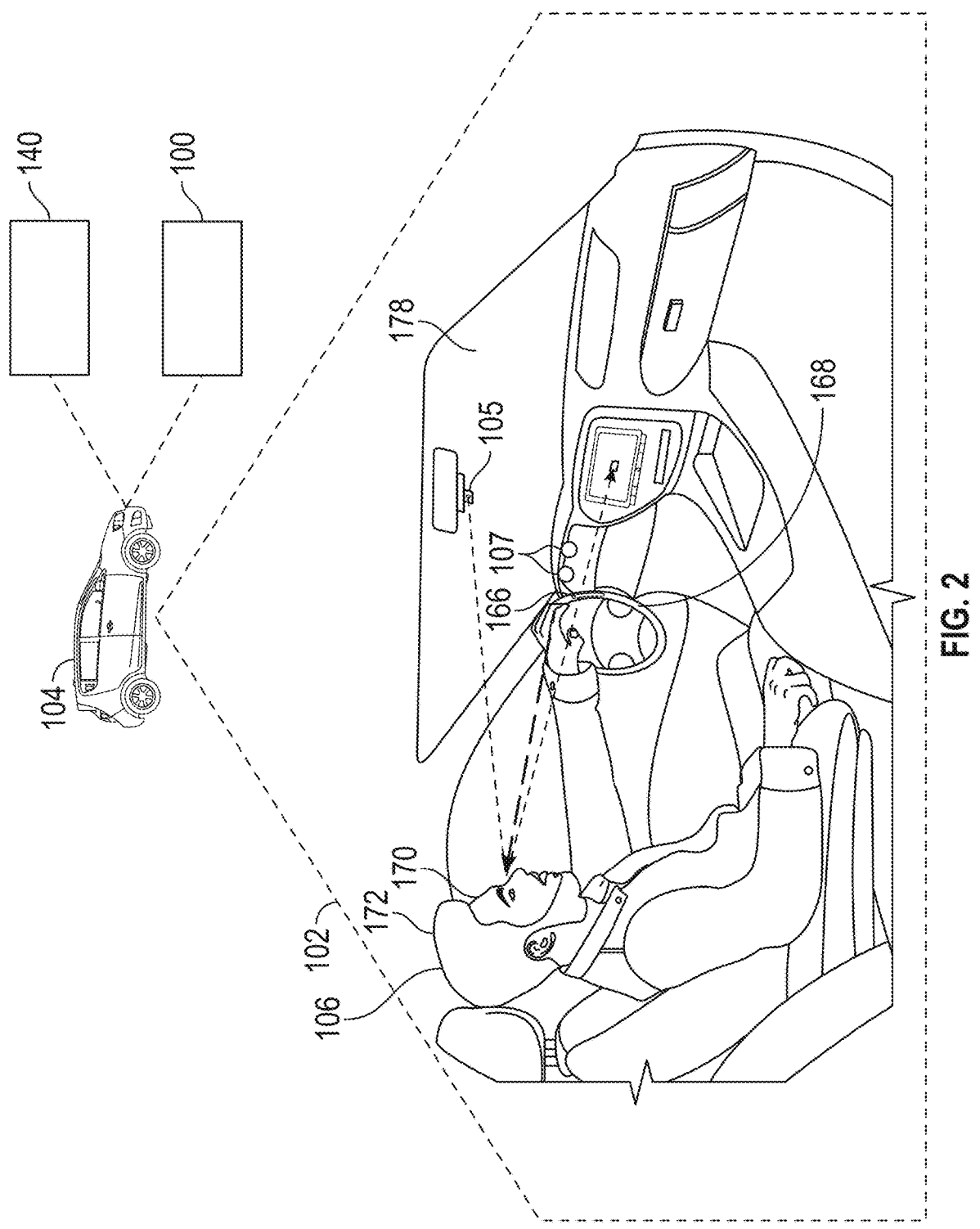
FIG. 2 is an illustrative diagram a vehicle monitoring system having a vehicle with an enlarged interior view of the vehicle.

The state machine governing the autonomous driving system is normally implemented by an electronic control unit (ECU), which comprises a preprogrammed processor and/or other suitable gate array logic deployed in the vehicle and powered by the vehicle's electric power source. In FIG. 2, the ECU is represented diagrammatically by ECU block or simply ECU 140.

Driver Monitoring System

In at least some levels, the state machine of an autonomous driving system employs a driver monitoring system or DMS. The conventional DMS employs camera sensors mounted on the vehicle and positioned to obtain information on whether and how consistently the driver is paying attention to the road. FIG. 2 illustrates components of such a driver monitoring system. The DMS 100 monitors a driver's viewing area 102 within a vehicle 104 using a suitably placed camera mounted to the rearview mirror, as at 105, to the dashboard in front of the driver as at 107.

As described in this disclosure, the state machine is enhanced to additionally use advanced multimodal sensors deployed within a mobile device. These additional sensors together with associated hardware and software make up a system referred to as the iDMS, to differentiate these advanced sensor modalities from the conventional vehicle-mounted DMS sensors.

Escalation State

In an autonomous vehicle, the state machine at each level (above Level Zero) will typically have at least one state known as an escalation state. The purpose of the escalation state is to engage the driver (or attempt to engage the driver) in a manner appropriate in the context of the current state machine level. The escalation state is thus the interface between the driver and the state machine.

There are two aspects to escalation, (a) sensing: detecting or ascertaining the driver's alertness or level of engageability and (b) response: generating various alarms to increase the driver's engageability as appropriate for the current situation and/or to take appropriate autonomous evasive action if the attempts to increase the drivers engageability are unsuccessful.

To transition into an escalation state, the ECU needs relevant information about the driver's current engageability level. The driver monitoring system (DMS and/or iDMS if implemented) performs the sensing function designed to supply that driver information. The state machine then commands the response.

As suggested above, the escalation state response will likely differ depending on what autonomous driving level the vehicle is operating in. In Level 2 the escalation response provides alerts designed to remind the driver to pay attention to the road. In higher levels (e.g., Level 3, Level 4, Level 5) the escalation response may do more than simply alerting the driver. For example if the driver is deemed incapacitated the escalation response may cause the vehicle to safely slow down, move to the side of the road and stop, for example.

Figure 4:
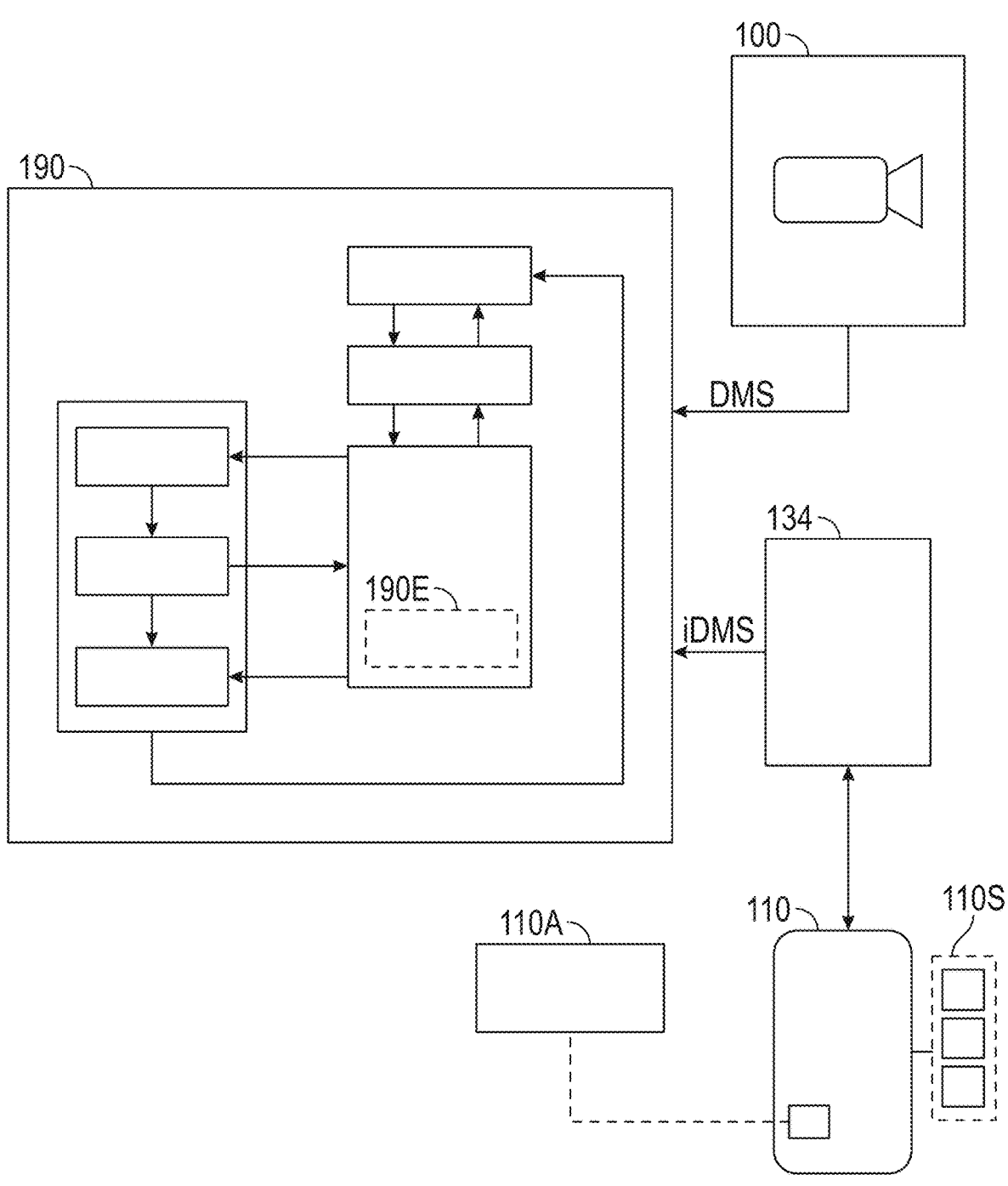
FIG. 4 is a block diagram illustrating how the augmented state machine and interface with mobile device sensors may be achieved.

Interfacing Mobile Device with State Machine—Augmented Autonomous Control System Architecture FIG. 4 illustrates how the mobile device 110 is interfaced with the autonomous vehicle state machine, shown diagrammatically at 190. The mobile device 110 has installed on it the driver monitoring application (App) 110A which is programmed to perform several functions. First, the App 110A captures data from the multimodal sensors 110S furnished by the mobile device 110. Second, the App uses these captured data to calculate the iDMS signal or score which conveys information about the driver's engageability level. Third, the App is also programmed to perform driver alerting functions according to instructions received from the state machine 190 (or from the ECU upon which the state machine 190 is running.

The mobile device 110 communicates with the state machine 190 via the mobile device interface application (MDIA) 134, which may be implemented using CarPlay or Android Auto. As illustrated, the iDMS score is communicated to the state machine 190 through this MDIA interface. The state machine 190 is also receptive of the DMS score obtained from DMS 100, which typically uses a camera sensor as described.

The conventional state machine will have already been configured to utilize the DMS score from DMS 100. In order to utilize the iDMS score, the state machine 190 is augmented by adding at least one data receptor and associated state machine functionality, shown diagrammatically at 190E, to receive the iDMS score and utilize the information conveyed by the iDMS score to assist in determining how and when state transitions within the state machine are effected.

The functionality provided by the enhancement at 190E can also generate alert information that is conveyed through the MDIA 134 to the mobile device. In this way, the state machine can communicate directly with the driver through his or her mobile device.

Example of State Machine in Detail

Figure 5:
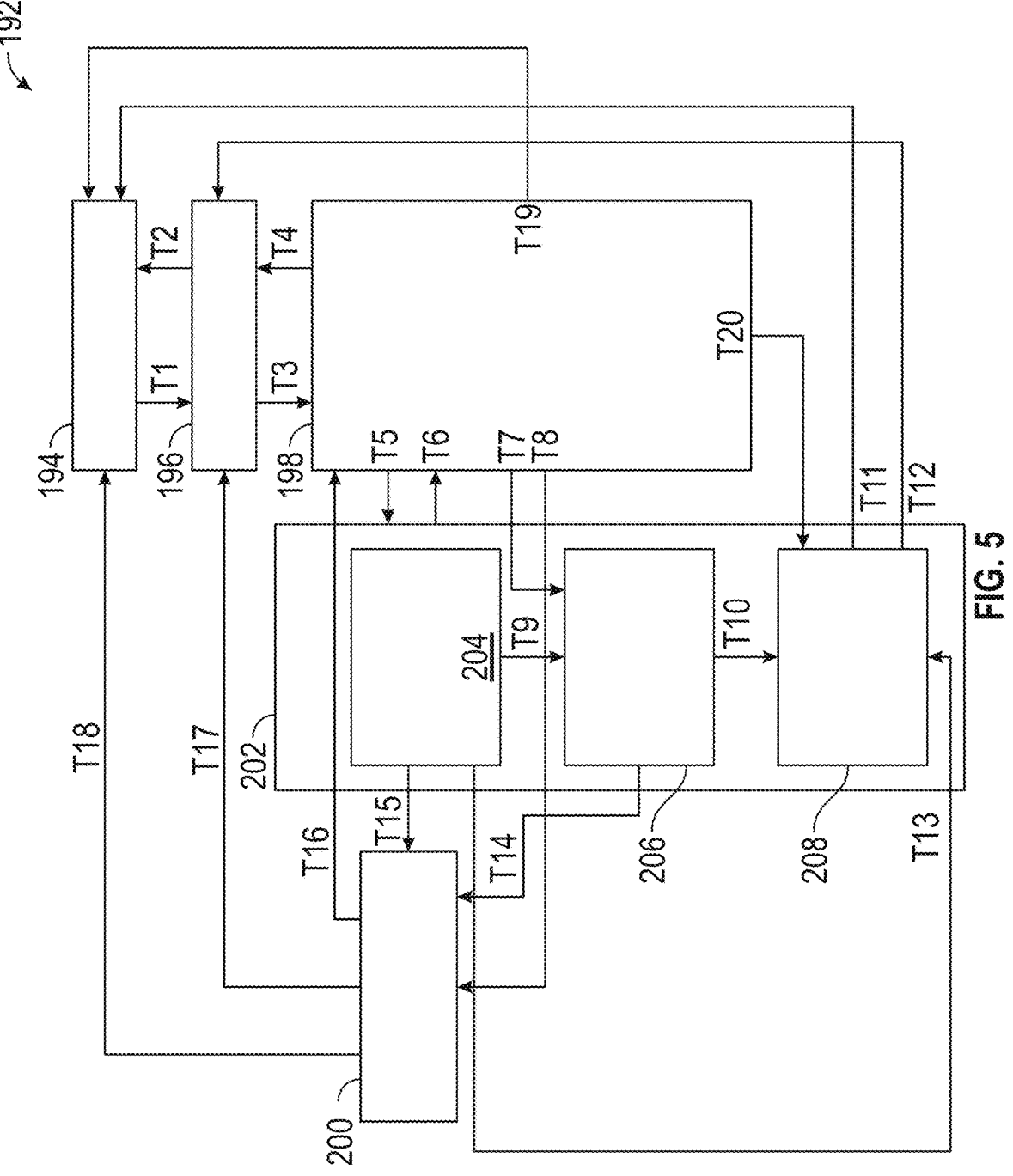
FIG. 5 is an exemplary state diagram, illustrating Level 2 autonomous control.

To better appreciate how the escalation state fits into the overall state machine architecture, refer to FIG. 5 which illustrates an example of a Level 2 state machine. The Level 2 state machine utilizes several different states illustrated generally at 192. These states include a disabled state 194 that identifies that an autonomous level is OFF, an enabled state 196 that identifies that an autonomous level is ON, a Fully Active state 198, a Limited Capability state 200, and an Escalation state 202.

The Escalation state 202, is subdivided into three further states, comprising an Inattentive Driver Escalation state 204, a Non-Urgent Request State 206, and an Urgent Escalation State 208.

The state machine 190 transitions into the escalation states based on the driver alertness as measured by the driver monitoring module 180.

The state machine in FIG. 5 transitions from one state to another as shown by arrowed lines bearing labels T1-T20. For detailed information regarding the nature of these and other state transitions see Appendix A at the end of this written description. While the information provided in Appendix A relates principally to autonomous vehicle control, one skilled in the art should appreciate that the nature of the state transitions may also relate to critical conditions of the vehicles operational state (e.g. vehicle warning indicators such as check engine, TPMS, low fuel, etc.).

In addition, the reader may want to refer to Appendix B which gives a detailed example of how the escalation state in a Level 2 environment may be carried out based in DMS and iDMS scores or signals. Appendix C gives a detailed example of how the escalation state in a Level 3 environment is carried out based on face position, driver button-press and eye position signals.

As will discussed next below, the escalation states for certain autonomous Levels are augmented according to the disclosed teachings, to support enhanced features by utilizing the more sophisticated sensors are provided by a mobile device.

Adding Enhanced Features to State Machine

In a Level 2 automation scenario the driver is still responsible for driving the car-such as the case where the driver has engaged cruise control. In a Level 2 escalation scenario, sensing may be performed, for example, by monitoring the gaze of the driver's eyes using a dash-mounted camera. When the driver's eyes do not appear to be following the road, an audible alert, a shake of the steering wheel, etc. are issued to "remind" the driver to pay attention to the road.

In a Level 3 automation scenario the driver is no longer driving the car—the automation system is doing the driving and hence the driver is not responsible for watching the road. However the driver is still present in the driver's seat and may be called upon to take over driving duties when prompted by the system. In the Level 3 scenario the escalation process still has sensing and response components, however the context is different. Sensing is performed to detect whether the driver is engageable to be called upon to take over driving duties if needed. Response may be performed through audible alert, and/or visual display query, prompting the driver to perform some action indicating that he or she is cognitively aware and capable of taking over driving responsibilities if required. Such escalation does not necessarily mean that transfer vehicle control to the driver is imminent. In the Level 3 context escalation is simply the system mechanism to determine that the driver has the capacity to become engaged in operating the vehicle if called upon. In this regard, a driver who has simply fallen asleep, can be awakened and thus rendered engageable to take over. A driver who has passed out due to a medical condition cannot be awakened and is thus incapable of taking control of the vehicle. The autonomous driving system needs to know this, and thus sophisticated sensors are used to assess the driver's cognitive state of engageability.

Mobile Device Provides Sophisticated Sensors to Measure Engageability

Use of the driver's mobile device in a moving vehicle has traditionally been considered a distraction. Yet where autonomous driving features are provided, it is quite natural for a driver to glance at or become totally absorbed in his or her mobile device, handling personal matters or passing the time enjoying entertainment. Indeed, the mobile device may well be the reason why the person seated in the driver's seat is not paying close attention to the road during Level 3 through Level 5 autonomous operation.

The disclosed system embraces a driver's use of his or her mobile device by exploiting sensors within the mobile device to assess the driver's engageability metric or score, and this engageability score plays a crucial role in informing the state machine when and how to transition to other states.

Engageability Score

In the enhanced state machine disclosed here, engageability is a measure of the driver's cognitive state. Engageability is used to assess whether the driver has the mental capacity to take over driving responsibilities as may be required when transitioning to particular state machine states. A driver's engageability is not a static value. Rather engageability can vary over time, often quite rapidly.

Engageability becomes particularly important in Level 3 through Level 5 automation where the state machine needs to know the driver's engageability level in advance of making certain state transitions where timing is important. For example, when operating fully autonomously at a creepingly slow pace during freeway congestion, the autonomous system will have ample time to gain the driver's attention before transitioning to a less autonomous driver assisted state. In contrast, then operating fully autonomously at normal highway speeds, the autonomous system has considerably less time to gain the driver's attention before transitioning to a less autonomous driver assisted state, because the vehicle is traveling much faster.

In this context, the sophisticated sensor capabilities of the driver's mobile device (e.g. smartphone, tablet, smartwatch or other personal data assistance devices, individually or collectively) can greatly improve the resolution and accuracy of the engageability metric, and having such greater resolution and accuracy sensor data can have a great impact on state machine transition calculus. For example, in the case where the autonomous system is operating in the Level 3 state while the vehicle is traveling on a freeway with little traffic. The driver is absorbed watching a video on a mobile device. Based on multimodal sensor data from the mobile device, the engageability metric supports the conclusion that the driver is awake but not necessarily in a state to be able to instantly take over driving control. Perhaps a few seconds would be required to pull the driver's attention away from the video—but this may be adequate given the vehicle speed in a light traffic condition.

However, if the freeway traffic becomes more congested, the engageability metric may indicate that in current traffic, the few seconds it would take to gain the driver's attention is insufficient. Thus the state machine would transition to an escalation state which, in this case, might audibly inform the driver to refrain from video watching and start paying attention to current traffic conditions.

Enhanced Sensing Modalities

The App running on the mobile device is able to generate a far more refined engageability score or signal than fixed, vehicle mounted sensors because the App has access to a wide variety of different types of sensor data.

The set of sensor data available on the mobile device effectively provide orthogonal metrics which are indicative of the driver's cognitive state. The metrics are orthogonal in the data fusion sense that not all metrics measure the same property. An eye movement metric gives some measure bearing on whether the eyes are tracking in a pattern expected when scanning the road. A face recognition metric provides information on identity of the person whose eyes are scanning the road (that person may not be the driver, in which case the eye tracking data may be irrelevant. Text typing data, such as may be observed when the mobile device user is composing a text message typically indicates a high level of cognitive awareness—indicating that the person is alert and capable of being engaged to take over driving responsibilities if called upon.

These are merely some examples of the diverse kinds of sensor data that may be obtained from a modern-day mobile device such as a smartphone. Other examples of sensor data include, but are not limited to inertial sensor data, indicative of hand movement, biometric data, indicative of the person's heartbeat, breathing rate and the like, all of which may be relevant to whether the driver is capable of taking over driving responsibilities. Note that some sensor data obtained from the mobile device may have been obtained using sensors worn on the driver's body, such as found in smart watches communicating wirelessly with the mobile device.

Architecture of the Mobile App

Figure 6:
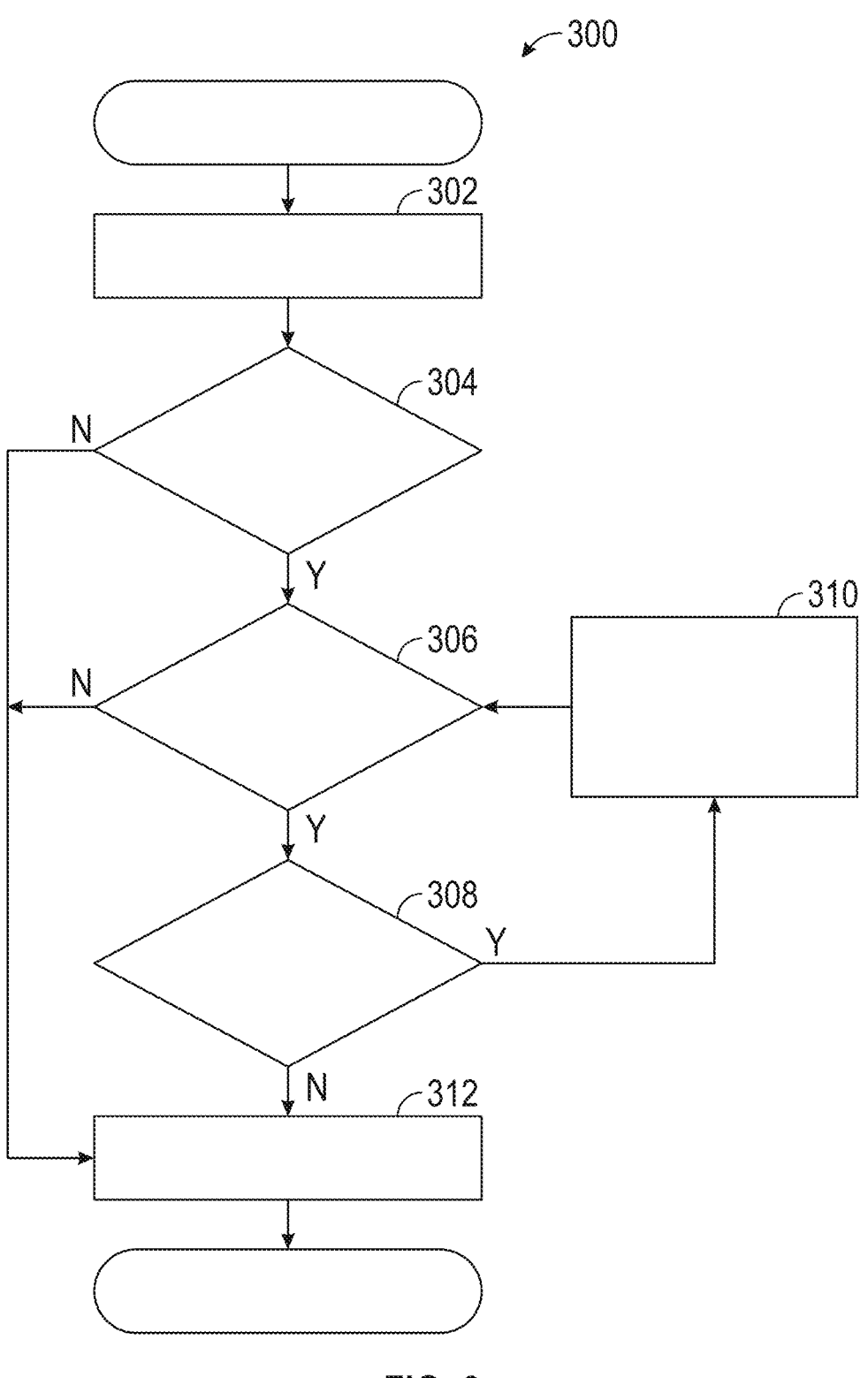
FIG. 6 is a flow chart explaining the driver monitoring system (DMS)

Referring to FIG. 6, the mobile device 110 includes a camera module 466, a button module 468 and an internet driver monitoring system or iDMS module 470 in communicatively coupled to the camera module 466 and the button module 468. The camera module 466 includes a camera 472 and a tracking module 474. In this example, the tracking module 474 includes an iDMS facial imaging device 476 and an iDMS eye tracking device 478. The camera 472, the iDMS facial imaging device 476 and the iDMS eye tracking device 478 are similar in features and functions as the vehicle camera 442, the vehicle facial imaging device 456 and the vehicle eye tracking device 458 of the vehicle 412 and for the sake of brevity will not be repeated here. In this example, the iDMS facial imaging device 454 detects one or more positions of the head 172 or the face 170 of the driver 106 and output facial tracking data related to the facial position of the driver. Similarly, the iDMS eye tracking device 478 is configured to detect one or more eye position of the driver 106 and, in response, output eye tracking data related to the one or more eye positions of the driver 106.

In some forms, the button module 468 is configured to display a digital button 480 on a screen 482 of the mobile device 410. In at least one form, the digital button 480 is configured as a user input designed to measure user engagement with the mobile device. In some forms, the button module 468 is configured to periodically display the digital button 480 at a predetermined interval time. In one form, the button module 468 is configured to display the digital button 480 for a period of time until the driver 106 presses the digital button 480 and/or the period of time expires. In another form, the button module 468 is configured to determine if the digital button 480 was pressed within the period of time and transmits button tracking data in response thereof. For example, the button module may be configured to determine whether the driver has pressed the digital button within a predetermined period of time and transmit button data to the iDMS module, in response.

In one form, the iDMS module 470 is a background application configured to run in the background of an operating system on the mobile device 110. In one form, iDMS module 470 is configured to non-intrusively capture multimodal driver engageability data without interaction of from the driver via the mobile device 110. In one form, the iDMS module 470 is configured to monitor the driver while the vehicle operates in an autonomous level of L2 or higher. In some form, the iDMS module 470 is configured to track data captured of the driver including image data, eye-tracking data, and usage data while the driver engages with a driver selected, interactive application that simultaneously runs in the foreground of the operating system of the mobile device 110.

In some aspects, the iDMS module 470 is configured to determine a driver alertness score or iDMS score based on at least one of the facial tracking data, the eye tracking data, button press state, an iDMS operation state, the usage data or a combination thereof. Using the facial data, the iDMS is configured to determine a driver face score in one form. For example, the facial data may include data related to one or more facial positions detected via the iDMS facial imaging device 476 as detailed above. The facial positions may include a front position, a left position, a right position, within field of view range, and an undetected. Each facial position is assigned a predetermined score. In this example, an assigned score for each facial position may include the undetected position=0-24 points; within field of view range position=25-49 points; left position or right position=50-74 points; and the front position=75-100 points.

In another form, the iDMS module 470 is configured to determine an eye position of the driver based on the eye position data received from the eye-tracking device. Similar to the facial position, the eye positions include a front position, a left position, right position, a within field of view range position and an undetected position. In some aspects, the eye position and their respective scores can include the undetected position=0-24 pts; the within field of view range position=25-49 points; left or right position=50-74; and the front position=75-100 points.

In still another form, the iDMS module 470 is configured to determine one or more faulty conditions related to the iDMS module 470. The one or more faulty conditions include, but not limited to, data related a health, a capability, or a combination thereof.

Example of App Programming

Figure 7:
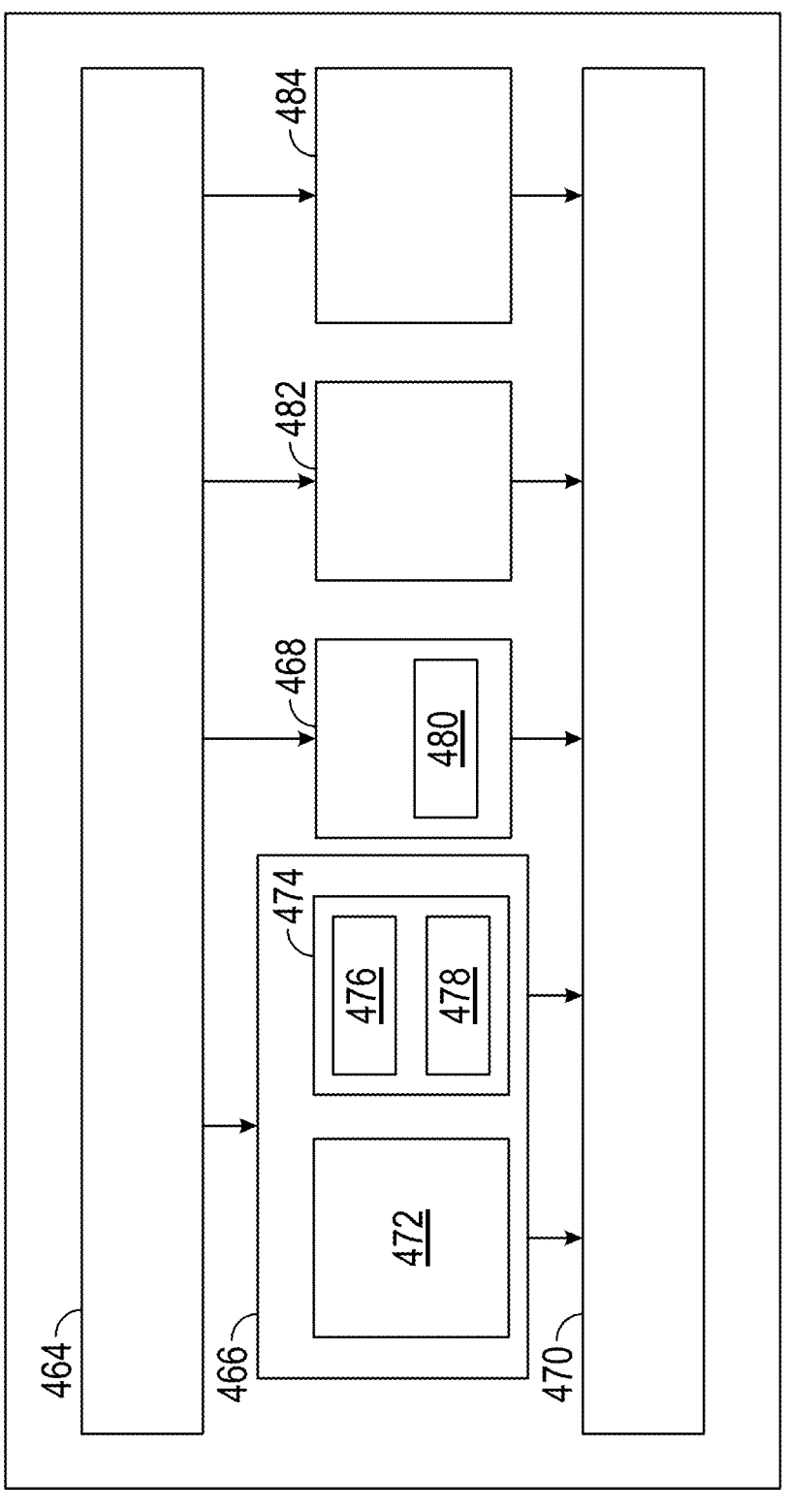
FIG. 7 is a block diagram describing the architecture of mobile device software application.
Figure 8:
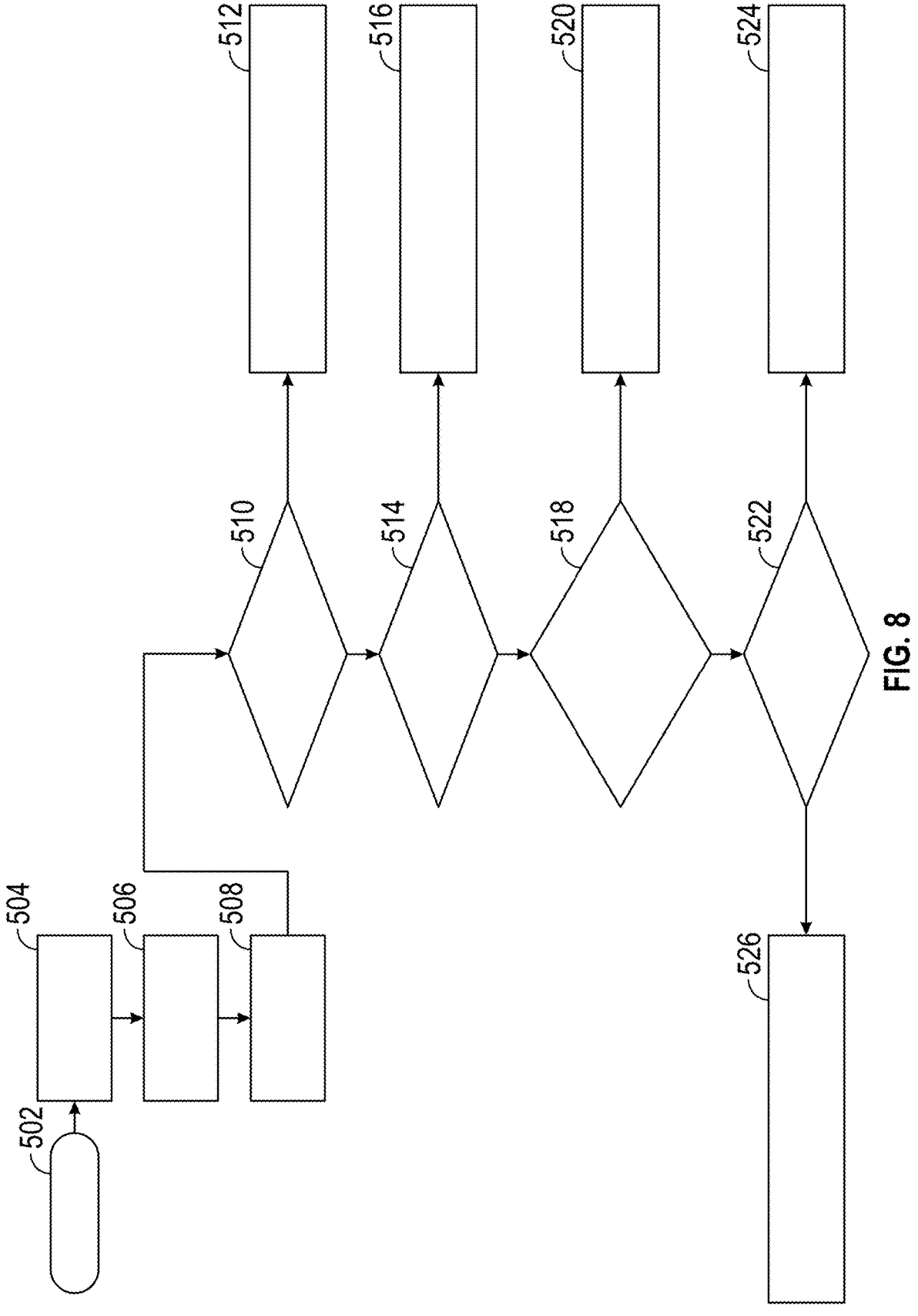
FIG. 8 is a flowchart illustrating how an exemplary enhanced driver engageability score may be computed from eye movement data.

Referring to FIG. 7, a flow chart of a method 500 for determining an iDMS score Is provided. At step 502, the background application is initialized. At step 504, the method gets an object position at [x, y, z] coordinates. At step 506, smooth an image of the object. At step 508, factoring is done. At step 510, the method determines if an object position is detected. If no, then score N=0 at step 512. If yes, the method proceeds to step 514. At step 514, the method determines if the object is in the field of view or FoV? If no, the method determines that the score where Nmin=0 and Nmax=24 at step 514. If yes, the method determines if the object is 80% centered at step 518. If no, the method determined the scoring, where Nmin=25 and Nmax=49 at step 520. If yes, the method proceeds to step 522. At 522, the method determines if the object is centered. If no, the method determines the score, where Nmin=50 and Nmax=74 at step 524. If yes, the method determines the score, where Nmin=75 and Nmax=100. For each of the position determinations, the position is compared to a normalized threshold based on an initial configuration. For example, being 80% out of center indicates that the average eye: right eye goes above 610 and eye: left below 300. One skilled in the art should appreciate that the limits and associated numerical values set forth above are exemplary for scaling and griding the field of view. These limits and associated numerical values may be calibrated to maintain different behavior (conservative vs. allowed) and/or levels of escalation.

In another form, the iDMS is configured to report one or more of the facial recognition score, the eye position score, and/or the button score. In one form, the iDMS is configured to aggregate each of the facial recognition score, the eye position score, and/or the button score into a single iDMS score and, in response, report iDMS alertness score data to the state machine. In another aspect, the iDMS module is configured to receive an escalations status from the state machine and response thereof. In one form, the iDMS is configured to lock a screen of the remote handheld device, and/or transmit a report via contextual application to a third party. In another aspect, the iDMS is configured to detect eye gaze towards the remote mobile device. In still another aspect, the iDMS is configured to detect usage data associated with one or more applications used via the remote mobile device. In this example, determine an alertness value of the driver. The alertness value is sent to the vehicle, wherein the vehicle determines whether to escalate to a driver alert or a vehicle stop.

The iDMS module may also include software programs including computer readable code for sending a signal to the in-vehicle object to trigger a software program, encoded on a computer readable medium and executable by the processor associated with the object, to automatically alter the functionality of the object. This signal is sent, for example, in response to receiving an indication that i) the vehicle driver's eyes have or face has been focused on the handheld device for a predetermined amount of time, and/or ii) the driver is not interacting with one or handheld applications for a period of time.

Vehicle Network Communication Bus

Figure 3:
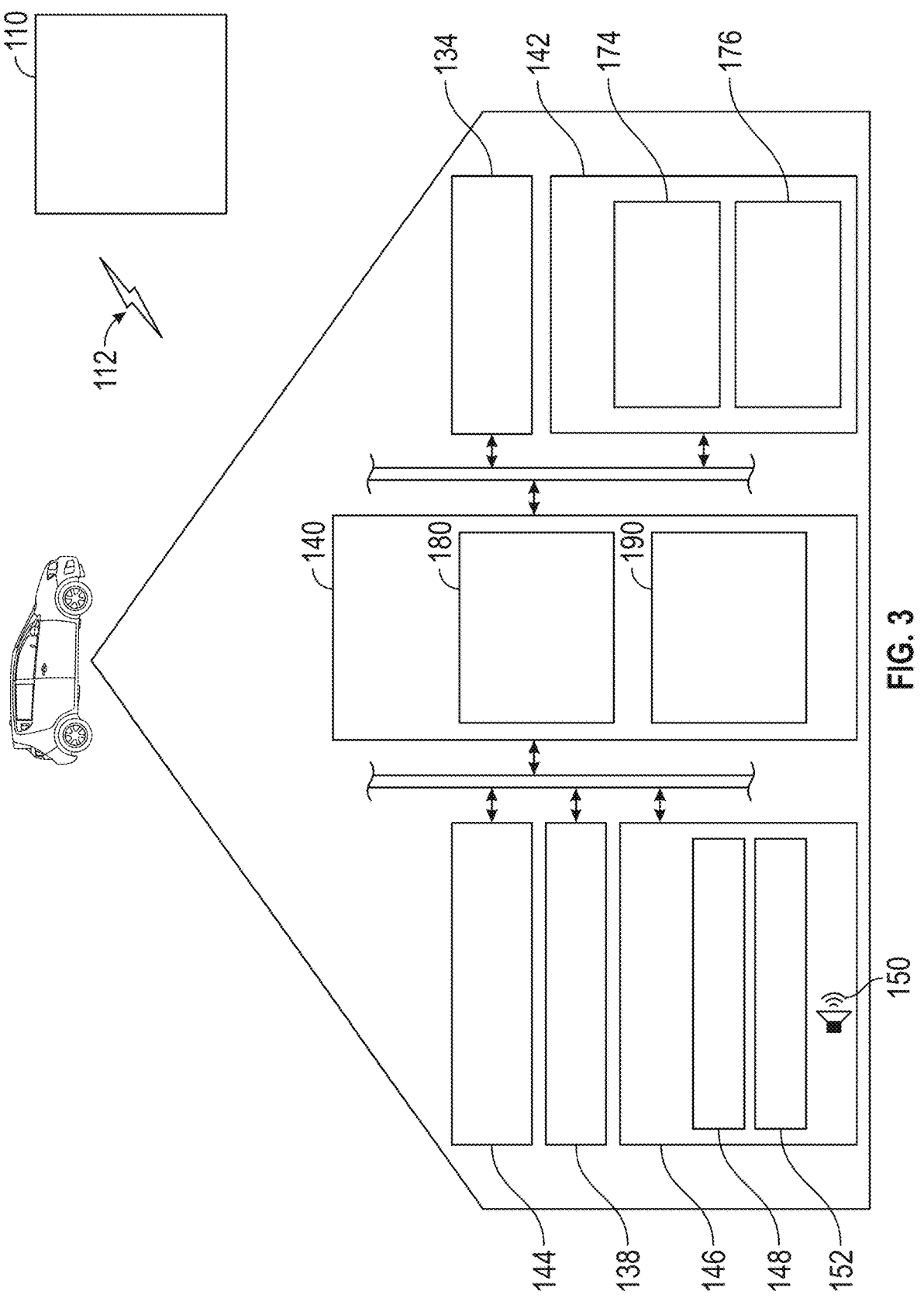
FIG. 3 is a block diagram explaining a vehicular communication bus architecture.

Referring to FIG. 3, the vehicle 104 includes a mobile device interface application or MDIA 134, a vehicle network communication bus 136, a user interface device 138, an electronic control unit (ECU) 140, a camera module 142, one or more vehicle sensors 144, and one or more notification devices 146. The vehicle network communication bus 136 is electrically coupled to the ECU 140, the camera module 142, the one or more vehicle sensors 144 and the one or more notification devices 146 and allows communication among the respective connected entities. The vehicle network communication bus 136 includes a controller area network (CAN), a media-oriented system transfer (MOST), a local interconnection network (LIN), an Ethernet, and other appropriate connections, such as those that conform with known ISO, SAE, and IEEE standards and specifications and the like. The vehicle network communication bus

136 allows an exchange of data and signals between any one or more connected devices, components and/or sensors.

The mobile device interface application or MDIA 134 is an interface electrically coupled between the mobile device 110 and the vehicle 104. The MDIA 134 exchange data between an operating system (not shown) of the vehicle 104 and an operating system (not shown) of the mobile device 110.

The user interface device 138 receives one or more inputs from the driver 106 to indicate a selection for a vehicle driving feature/function. In one form, the user interface device 138 determines an autonomous driving level 116 associated with the selected vehicle driving features. In response to determining the autonomous driving level, the user interface device 138 transmits a notification indicative of an automation trigger associated with the autonomous driving level to the ECU 140. In one form, the user interface device 138 includes a display unit 148, an audio unit 150, and haptic unit 152. The display unit 148 includes a Vacuum Florescent Display (VFD), an LED (Light Emitting Diode) display, a driver information center display, a radio display, an arbitrary text device, a head-up display (HUD), a LCD (Liquid Crystal Diode) display, and/or the like. The audio unit 150 include a speaker and/or the like.

In some forms, the one or more vehicle sensors 144 monitor one or more vehicle systems and/or subsystem and transmit vehicle data indicative of a health status of the one or more vehicle systems and/or subsystems. For example, the one or more vehicle sensors 144 include, but not limited to, cameras, gyroscopes, accelerometers, speed sensors, magnetometers, emission sensors, and/or the like.

In this example, the camera module 142 is positioned on a steering column 154 in front of the driver 106. In some forms, the camera module 142 is mounted in front of the driver 106 below a rear-view mirror 156. As best shown in FIG. 3, the camera module 142 includes a camera 158 and a tracking device 160 communicatively coupled to the camera 158. The camera 158 captures image data or video data of the face of the driver 106 while the vehicle 112 is operating in an autonomous driving level 116. The camera module 142 includes a processor (not shown) associated therewith that executes an application/computer readable code. The application commands the camera module 142 to monitor the facial position of the vehicle driver while the vehicle 104 is in operation. In another form, the tracking device 160 includes one or more infrared or IR LEDs 166 located in a steering wheel 168. In one form, the IR LEDs 166 provides illumination of a face 170 and a head 172 of the driver 106. Using the illumination, the camera 158 captures an IR illumination is reflected from the driver's face 170 and head 172 in one form.

In another form, the tracking device 160 includes a facial imaging device 174 and an eye-tracking device 176. The facial imaging device 174 is configured to use the image/video data to determine that the driver's then-current line-of-sight based, at least in part, on the facial position of the driver 106. The facial position may be determined, for example, by detecting the angle at which the driver's head is positioned in vertical and horizontal directions. It is to be understood that the facial imaging device 174 continuously monitors the face of the driver 106 so that the facial imaging device 174 can later determine when the head 172 or face 170 of the driver is positioned away from the user interface device 138 or the line of sight (for example, back on the road).

In another form, the eye-tracking device 176 detects an eye position of the driver 106 while the vehicle 104. In this example, the eye-tracking device 176 is used to detect the driver's eye position (e.g., the point of gaze) and the movement of the driver's eyes (e.g., the motion of the eyes relative to the driver's head). This may be accomplished by utilizing a facial imaging camera (not shown), which may be placed inside a vehicle interior in any position that is in front of (either directly or peripherally) the driver. In another example, the eye-tracking device 176 includes an infrared light (IR) (not shown) and is configured to track the movement of the driver's eyes is determined by IR light reflected from the cornea of the eye, which is sensed by a suitable electronic device or an optical sensor (not shown). The information pertaining to the eye motion may then be utilized to determine the rotation of the driver's eyes based on changes in the reflected light. Upon determining that the driver's eye position has changed, the eye tracking device is configured to determine the direction at which the driver's eyes are focused. If, for example, the vehicle driver's eye position is such that his/her eyes are focused on the user interface, the eye-tracking device 176 transmits eye tracking data indicating that the driver's eyes are focused on or in the direction of the user interface device. It is to be understood that the eye-tracking device 176 continues to monitor the eye position of the driver's eyes, so that the eye-tracking device 176 can later determine when the driver's eyes are positioned away from the user interface device 138 (for example, back on the road). When this occurs, the eye-tracking device 176 is further configured to transmit eye tracking data, for example, to a related ECU 140 or the user interface 120 indicating that the driver's eyes are no longer focused on the user interface device 138 but rather are focused in a forward direction. In response to receiving this signal, the related ECU 140 can initiate eye tracking data for the user interface device 138 to resume its original functionality.

ECU Details

In one form, the ECU 140 controls one or more vehicle systems or subsystems in the vehicle 104. For example, ECU 140 may include, but not limited to, airbag control units, convenience control units, door control units, engine control units, machine interface control units, on-board diagnostic units, powertrain control units, seat control units, speed control units, transmission control units, telephone control units and the like. In this example, the ECU 140 includes a driver monitoring module 180 and a state machine 190 in communication with the user interface device 138 and the camera module 142.

In one form, the driver monitoring module 180 is communicatively coupled to the user interface device 138 and is configured to receive the one or more inputs indicative of a driver's selection for one vehicle driving features/functions. In some aspect, the driver monitoring module 180 determines an autonomous driving level 116 based on the driver's selection and transmits the autonomous driving level to the state machine 190. In another aspect, the driver monitoring module 180 is communication with the one or more vehicle systems and/or subsystems and receives vehicle signal information indicative of a health of the vehicle systems and/or subsystems. In still another form, driver monitoring module 180 used the vehicle tracking data of the vehicle to determine an engageability score of the driver and in response transmits the engageability score to the state machine 190. In one form, the engageability score of the driver indicates whether the driver in engaged and/or alert to environmental conditions of the vehicle and can take over vehicle operations if necessary. In this example, the driver monitoring module 180 is communicatively coupled to the camera module 142 and is configured to receive vehicle tracking data. In one form, the vehicle tracking may include at least one of facial recognition data, eye tracking data, or a combination thereof. In one form, the driver monitoring module 180 is communicatively coupled to the user interface device 138 and is configured to receive button tracking information.

APPENDIX A

Example 1: Diagram Transition Description

| Transition Number | From State | To State | Example that trigger Transition |
|---|---|---|---|
| T1 | Disabled | Enabled | Destination required is within ODD and Map coverage + Driver pressed the feature button. |
| T2 | Enabled | Disabled | When any of the following is met: Driver pressed the feature button to disable the operation Longitudinal Health Conditions are not met Lateral Health Conditions are not met Vehicle Health Conditions are not met Alternative Feature is requested |
| T3 | Enabled | Fully Active | When ODD is fully met and all feature related SW rings are OK. |
| T4 | Fully Active | Enabled | When any of the following conditions are met: T1 conditions are satisfied with: DMS set to driver steering override Driver override (by pedals) Vehicle is in standstill |
| T5 | Fully Active | Inattentive Driver Escalation | When driver inattentiveness is detected by DMS. |
| T6 | Inattentive Driver Escalation | Fully Active | Based on quick DMS recovery of detecting that the driver is back to be attentive. |
| T7 | Fully Active | Non-Urgent Escalation | When time allows e.g. approaching to ODD-excluded area |
| T8 | Fully Active | Limited Capability | upon either driver partial (longitudinal/lateral engagement) override. |

-continued

| Transition Number | From State | To State | Example that trigger Transition |
|---|---|---|---|
| | | | degraded capability e.g. no lane change due to specific local functional safety transient faults. |
| T9 | Inattentive Driver Escalation | Non-Urgent Escalation | When the timing exceeds, it leads to non-urgent escalation. If this exceeds further, it will transition to "urgent escalation". |
| T10 | Non-Urgent Escalation | Urgent Escalation | When the driver inattentiveness exceeds the non-urgency timing threshold. |
| T11 | Urgent Escalation | Disabled | After driver takeover the feature enablement is not possible due to existing faults in a system. |
| T12 | Urgent Escalation | Enabled | After driver takeover the feature is back to enabled as the vehicle and system health is OK and we are waiting for ODD clearance to move to Full Active. |
| T13 | Inattentive Driver Escalation | Urgent Escalation | In case DMS picks up that there is no driver in front. In case DMS system becomes faulty. |
| T14 | Non-Urgent Escalation | Limited Capability | When driver is detected to be back attentive and partially overrides the control. |
| T15 | Inattentive Driver Escalation | Limited Capability | When temporal inattentiveness is added with partial override. |
| T16 | Limited Capability | Fully Active | When partial override is completed and a full autonomous control is back in the loop. |
| T17 | Limited Capability | Enabled | When the driver override lasts for long time and/or becomes complete override and not partial and the vehicle health is OK. |
| T18 | Limited Capability | Disabled | When the perception starts to be invalid in more than one Field of View. When the driver override lasts for long time and/or becomes complete override and not partial and we are out of our ODD and the vehicle health is being compromised. |
| T19 | Fully Active | Disabled | Longer driver override conditions than in T7. |
| T20 | Fully Active | Urgent Escalation | When safety critical feature applications and systems notify functional safety issue e.g. Perception is Invalid. |

APPENDIX B

Example 2: Determining Escalation State in a Level 2 Environment

Face up front=1
Face not detected up front=0
Eyes to Road (DMS) or Eyes up front (iDMS)=1
Eyes off Road (DMS) or Eyes not detected (iDMS)=0

| DMS | | iDMS | | Current | Proposed |
|---|---|---|---|---|---|
| Face Position | Eye Position | Face Position | Eye Position | Method System State | Method System State |
| 0 | 0 | 0 | 0 | Urgent Escalation | Urgent Escalation |
| 0 | 0 | 0 | 1 | | |
| 0 | 0 | 1 | 0 | | |
| 0 | 0 | 1 | 1 | | |
| 0 | 1 | 0 | 0 | | |
| 0 | 1 | 0 | 1 | | |
| 0 | 1 | 1 | 0 | | |
| 0 | 1 | 1 | 1 | | |
| 1 | 0 | 0 | 0 | Inattentive Driver Escalation | Inattentive Driver Escalation |
| 1 | 0 | 0 | 1 | | |
| 1 | 0 | 1 | 0 | | |
| 1 | 0 | 1 | 1 | | |
| 1 | 1 | 0 | 0 | Fully Active | Fully Active |
| 1 | 1 | 0 | 1 | | Inattentive Driver Escalation |
| 1 | 1 | 1 | 0 | | |
| 1 | 1 | 1 | 1 | | |

APPENDIX C

Example 3: Determining Escalation State in a Level 3 Environment

Face up front=1
Face not detected up front=0
Driver presses the periodic button on central display unit=1
Eyes up front (iDMS)=1
Eyes not detected (iDMS)=0

L3 Central Display Unit

| Driver | | iDMS | | Current | Proposed |
|---|---|---|---|---|---|
| Face Position | Button Press | Face Position | Eye Position | Method System State | Method System State |
| 0 | 0 | 0 | 0 | Minimum Risk Maneuver | Minimum Risk Maneuver |
| 0 | 0 | 0 | 1 | | Fully Active (NA)) |
| 0 | 0 | 1 | 0 | | Non-urgent Request |
| 0 | 0 | 1 | 1 | | Fully Active |
| 0 | 1 | 0 | 0 | | |
| 0 | 1 | 0 | 1 | | Fully Active (NA) |
| 0 | 1 | 1 | 0 | | Fully Active |
| 0 | 1 | 1 | 1 | | |
| 1 | 0 | 0 | 0 | | Non-urgent Request |

-continued

L3 Central Display Unit

| | Driver | iDMS | | Current | Proposed | |
|---|---|---|---|---|---|---|
| Face Position | Button Press | Face Position | Eye Position | Method | Method System State | |
| 1 | 0 | 0 | 1 | | Fully Active (NA) | |
| 1 | 0 | 1 | 0 | | Non-urgent Request | |
| 1 | 0 | 1 | 1 | | Fully Active | |
| 1 | 1 | 0 | 0 | Fully | Fully Active | |
| 1 | 1 | 0 | 1 | Active | | |
| 1 | 1 | 1 | 0 | | | |
| 1 | 1 | 1 | 1 | | | |

What is claimed is:

1. A system to enhance performance and usability of a state machine implementation by an electronic control unit within a vehicle having autonomous operating capabilities, the state machine providing an escalation state used to exit from status quo, the system comprising:

a hand-held mobile device comprising:

a first non-transitory memory storing first programming instructions; and a first processor communicatively coupled to the first non-transitory memory, wherein the first processor executing the first programming instructions is configured to:

initiate a driver interactive application to operate during an operation of the vehicle while the vehicle is engaged in at least one of a semi-autonomous or an autonomous vehicle state, wherein the driver interactive application runs in a foreground of an operating system of the hand-held mobile device;

capture driver engageability data including image engagement data and eye engagement data tracking from one or more sensors of the hand-held mobile device when the driver interactive application is running in the foreground;

detect a facial engagement position of a driver of the vehicle based on the image engagement data;

detect an eye engagement position of the driver based on the eye engagement data;

determine a first driver engageability score based on at least one of the facial engagement position, the eye engagement position, or a combination thereof, wherein the first driver engageability score indicates a level of engagement of the driver with the driver interactive application; and report the first driver engageability score to the vehicle; and a driver monitoring system of the vehicle in communication with the hand-held mobile device, the driver monitoring system comprising:

a second non-transitory memory storing second programming instructions; and a second processor communicatively coupled to the second non-transitory memory, wherein the second processor executing the second programming instructions is configured to:

receive the first driver engageability score from the hand-held mobile device;

capture image tracking data and eye tracking data of the driver while operating the vehicle;

detect a tracked facial position of the driver of the vehicle based on the image tracking data;

detect a tracked eye position of the driver based on the eye tracking data;

determine a second driver engageability score based on at least one of the tracked facial position, the tracked eye position, or a combination thereof, wherein the second driver engageability score indicates whether the driver is engaged with the vehicle, alert to environmental conditions of the vehicle, or a combination thereof; and generate an enhanced engageability score based on the first driver engageability score and the second driver engageability score using an enhanced state machine, wherein the enhanced engageability score augments a decision by the enhanced state machine on whether an escalation state transition shall occur; and wherein the enhanced state machine additionally provides a signal to alert the driver through the hand-held mobile device when the escalation state transition is imminent.

2. The system of claim 1, wherein the escalation state is configured to transition the vehicle from a high level of autonomous operation to a lower level of autonomous operation.

3. The system of claim 1, wherein the escalation state includes notifying the driver, using the hand-held mobile device, via at least one of the following: sounding chimes, locking a display screen of the hand-held mobile device, or a combination thereof.

4. The system of claim 1, wherein the first driver engageability data includes tracking data captured of the driver using a background running application on the hand-held mobile device without interaction of the driver, wherein the tracking data includes at least one of the image engagement data and the eye engagement data.

5. The system of claim 4, wherein the tracking data captured of the driver includes image data of the driver while engaging with an interactive application that simultaneously runs on the hand-held mobile device along with the background running application.

6. The system of claim 4, wherein the tracking data captured of the driver includes input data from the driver while engaging with an interactive application that simultaneously runs on the hand-held mobile device along with the background running application.

7. The system of claim 4, wherein the tracking data captured of the driver includes facial imaging data of the driver, wherein the hand-held mobile device is configured to determine whether the driver is a registered driver for the vehicle.

8. The system of claim 4, wherein the tracking data captured of the driver includes the eye engagement data gathered via the background running application, wherein the background running application continuously monitors an eye gaze of the driver.

9. The system of claim 8, wherein the background running application is configured to determine whether the driver is alert based on the eye engagement data.

10. The system of claim 1, wherein the enhanced state machine additionally provides provide a second signal to lock the hand-held mobile device.

11. The system of claim 1, wherein the first processor executing the first programming instructions is configured to:

detect usage data associated with one or more hand-held device applications, wherein the first driver engageability score based the facial engagement position, the eye engagement position, and the usage data.

12. A method to enhance performance and usability of a state machine implementation by an electronic control unit within a vehicle having autonomous operating capabilities, the state machine providing an escalation state used to exit from status quo, the method comprising:

initiating a driver interactive application to operate during an operation of the vehicle while the vehicle is engaged in at least one of a semi-autonomous or an autonomous vehicle state, wherein the driver interactive application runs in a foreground of an operating system of the hand- held mobile device;

capturing driver engageability data including image engagement data and eye engagement data tracking from one or more sensors of the hand-held mobile device when the driver interactive application is running in the foreground;

detecting a facial engagement position of a driver of the vehicle based on the image engagement data;

detecting an eye engagement position of the driver based on the eye engagement data;

determining a first driver engageability score based on at least one of the facial engagement position, the eye engagement position, or a combination thereof, wherein the first driver engageability score indicates a level of interaction of the driver with the driver interactive application; and receiving the first driver engageability score from the hand-held mobile device;

capturing image tracking data and eye tracking data of the driver while operating the vehicle;

detecting a tracked facial position of the driver of the vehicle based on the image tracking data;

detecting a tracked eye position of the driver based on the eye tracking data;

determining a second driver engageability score based on at least one of the tracked facial position, the tracked eye position, or a combination thereof, wherein the second driver engageability score indicates whether the driver is engaged with the vehicle, alert to environmental conditions of the vehicle, or a combination thereof; and generating an enhanced engageability score based on the first driver engageability score and the second driver engageability score using an enhanced state machine, wherein the enhanced engageability score augments a decision by the enhanced state machine on whether an escalation state shall occur; and wherein the enhanced state machine additionally provides a signal to alert the driver through the hand-held mobile device when the escalation state transition is imminent.

13. The method of claim 12, wherein the escalation state includes transitioning the vehicle from a first level of autonomous operation to a second level of autonomous operation.

14. The method of claim 12, wherein the escalation state includes notifying the driver, using the hand-held mobile device, via at least one of the following: sounding chimes, locking a display screen the hand-held mobile device, displaying an escalation status to the driver or a combination thereof.

15. The method of claim 12, wherein the driver engageability data includes tracking data captured of the driver using a background running application on the hand-held mobile device without interaction of the driver.

16. The method of claim 15, wherein the tracking data captured of the driver includes image data of the driver while engaging with an interactive application that simultaneously runs on the hand-held mobile device along with the background running application.

17. The method of claim 15, wherein the tracking data captured of the driver includes input data from the driver while engaging with an interactive application that simultaneously runs on the hand-held mobile device along with the background running application.

18. The method of claim 15, wherein the tracking data captured of the driver includes facial imaging data of the driver, wherein the hand-held mobile device is configured to determine whether the driver is a registered driver for the vehicle.

19. The method of claim 15, wherein the tracking data captured of the driver includes the eye engageability data gathered via the background running application, wherein the background running application continuously monitors an eye gaze of the driver, wherein the background running application is configured to determine whether the driver is alert based on the eye engageability data.

20. A system to enhance performance and usability of a state machine implementation by an electronic control unit within a vehicle having autonomous operating capabilities, the state machine providing an escalation state used to exit from status quo, the system comprising:

a hand-held mobile device comprising:

a first non-transitory memory storing first programming instructions; and a first processor communicatively coupled to the first non-transitory memory, wherein the first processor executing the first programming instructions is configured to:

initiate a driver interactive application to operate during an operation of the vehicle while the vehicle is engaged in at least one of a semi-autonomous or an autonomous vehicle state, wherein the driver interactive application runs in a foreground of an operating system of the hand-held mobile device;

capture multimodal driver engageability data from one or more sensors of the hand-held mobile device when the driver interactive application is initiated, wherein the multimodal driver engageability data includes image engagement data, eye engagement data, and button engagement data;

detect a facial engagement position of the driver of the vehicle based on the image engagement data;

detect an eye engagement position of the driver based on the eye engagement data;

detect usage data associated with one or more hand-held device applications;

periodically display a digital button on a display screen of the hand-held mobile device;

detect whether the digital button was pressed to generate button tracking data;

determine a driver engageability score based on the facial engagement position, the eye engagement position, the usage data, and the button tracking data, wherein the driver engageability score indicates a level of engagement of the driver with the driver interactive application;

report the driver engageability score to the vehicle; and a driver monitoring system of the vehicle in communication with the hand-held mobile device, the driver monitoring system comprising:

a second non-transitory memory storing second programming instructions; and a second processor communicatively coupled to the second non-transitory memory, wherein the second processor executing the second programming instructions is configured to:

receive the driver engageability score from the hand-held mobile device;

capture image tracking data and eye tracking data of the driver while operating the vehicle;

detect a tracked facial position of the driver of the vehicle based on the image tracking data;

detect a tracked eye position of the driver based on the eye tracking data;

determine a driver alertness score based on at least one of the one or more facial engagement positions, the one or more eye engagement positions, or a combination thereof, wherein the driver alertness score indicates whether the driver is engaged with the vehicle, alert to environmental conditions of the vehicle, or a combination thereof; and generate an enhanced engageability score based on the driver engageability score and the driver alertness score using an enhanced state machine, wherein the multimodal driver engageability data includes tracking data captured of the driver using a background running application on the hand-held mobile device without interaction of the driver, wherein the background running application is configured to monitor the driver while the vehicle operates in an autonomous level of two or higher;

the enhanced engageability score augments a decision by the enhanced state machine on whether an escalation state transition shall occur; and the enhanced state machine additionally providing a signal to alert the driver through the hand-held mobile device that the escalation state is imminent.

\* \* \* \* \*